United States Patent [19]

Farmery

[11] 4,368,849
[45] Jan. 18, 1983

[54] SPRAY APPARATUS

[75] Inventor: Horstine Farmery, North Newbald, England

[73] Assignee: Union Carbide Corporation, Danbury, Conn.

[21] Appl. No.: 811,310

[22] Filed: Jun. 29, 1977

[30] Foreign Application Priority Data

Jun. 18, 1976 [GB] United Kingdom ............... 25287/76

[51] Int. Cl.³ .............................................. B05B 3/08
[52] U.S. Cl. ................................ 239/222; 239/222.11; 239/224
[58] Field of Search ................... 239/222, 222.11, 223, 239/224, 214.25

[56] References Cited

U.S. PATENT DOCUMENTS 3,994,438 11/1976 Farmery ............................. 239/222
4,006,858 2/1977 Farmery ............................. 239/222

Primary Examiner—John J. Love
Assistant Examiner—Michael J. Forman
Attorney, Agent, or Firm—Clement J. Vicari

[57] ABSTRACT

Apparatus for distributing flowable material over a base surface comprising 3 rotary members with mask means arranged to interrupt 40 to 60 percent of the flowable material from said first and second members and means for conducting the interrupted flowable material to the third rotary member.

16 Claims, 6 Drawing Figures

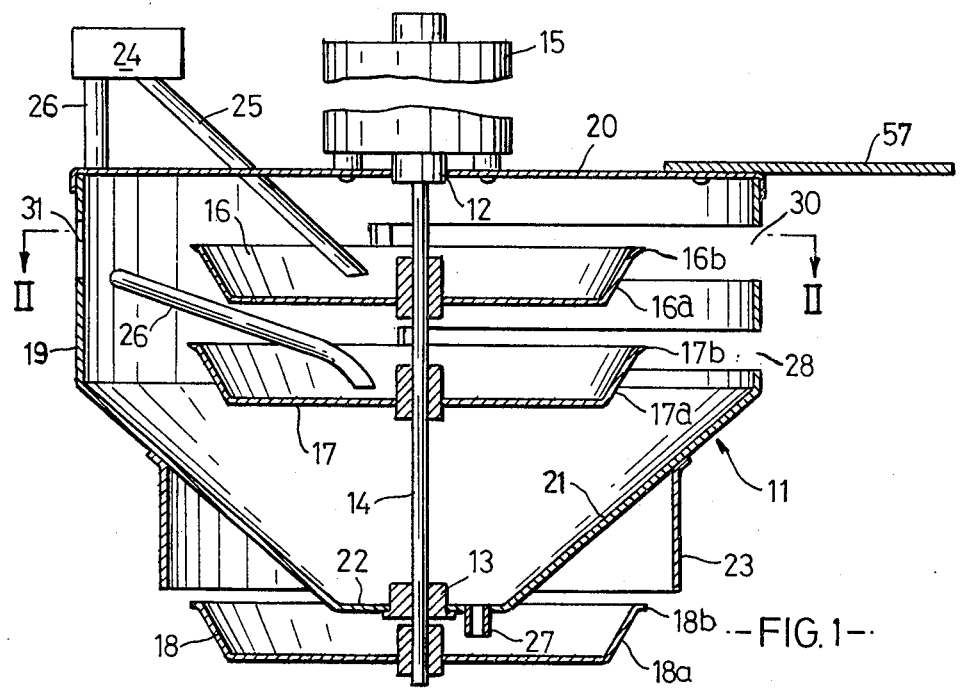
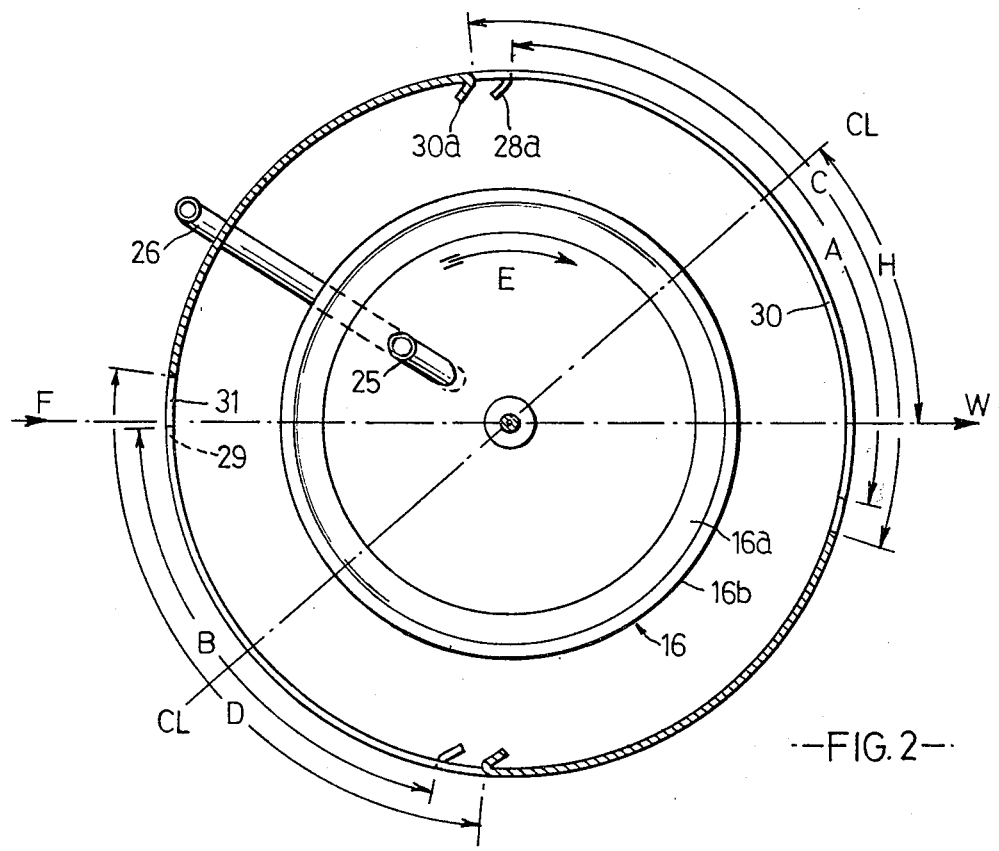

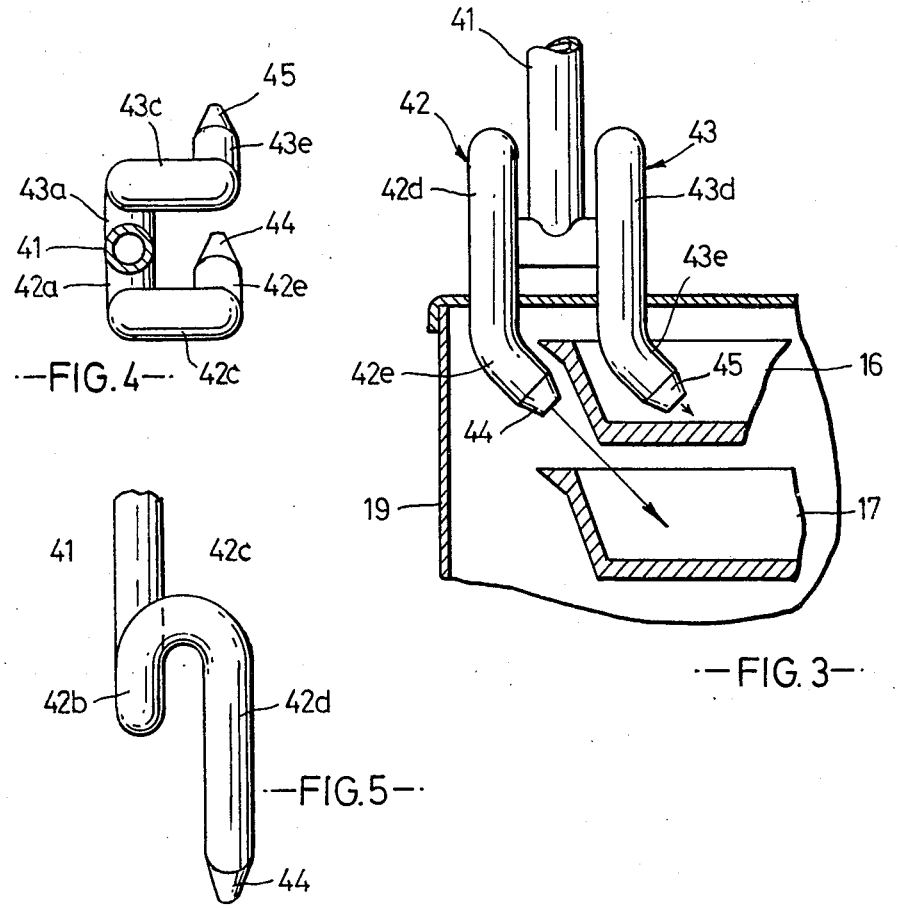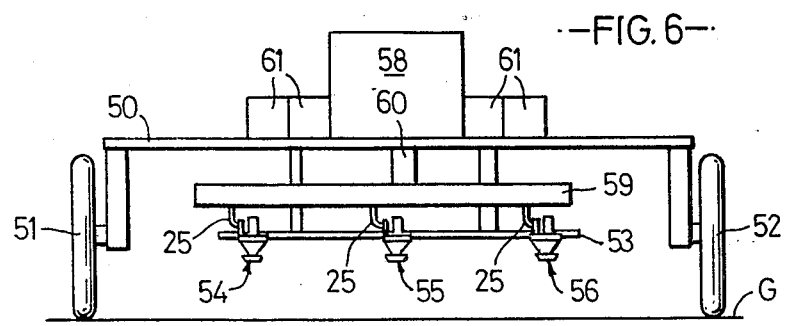

SPRAY APPARATUS

This invention relates to apparatus for distributing flowable material and has particular application to the distribution of chemical aids onto, or into, growing crops.

In our U.S. Pat. No. 3,994,438 issued Nov. 30, 1976, there is disclosed a method and apparatus for distributing flowable material and in a preferred embodiment of the invention described in said application two rotary members of substantially identical shape and configuration, are mounted one above the other on a substantially vertical shaft and rotated at uniform speed. Flowable material is supplied to the upper rotary member, is centrifuged therefrom to produce a spray pattern substantially uniformly disposed about the axis of rotation of said member, the spray pattern from said upper rotary member is interrupted at a plurality of locations spaced about the axis of rotation of the member, and the interrupted flowable material is conducted to the second rotary member and is centrifuged therefrom to produce a spray pattern substantially uniformly disposed about the axis of rotation of that member. By carefully selecting the locations and angular extent of the interrupting locations the uninterrupted spray pattern from the upper rotary member, superimposed on the uniform spray pattern from the lower rotary member, can produce, when the apparatus is displaced at constant speed in a given direction over a base surface, a substantially uniform distribution of flowable material transverse to the direction of displacement within the transverse width of the spray pattern. Preferably some 50% of the flowable material issuing from the upper rotary member is interrupted and diverted to constitute the supply of flowable material to the lower rotary member and by this means the volume of material dispensed from the upper rotary member in the uninterrupted spray pattern is substantially equal to the volume of flowable material dispensed from the lower rotary member.

It will be noted that with the above described arrangement the volume of material supplied to the upper rotary member and distributed from the periphery thereof is substantially twice the volume supplied to the lower rotary member and therefore the droplets released from the periphery of the upper rotary member are larger than those from the lower rotary member. Further, the rate of distribution is limited to the maximum volume which can be distributed as droplets from the upper rotary member.

Whilst the said preferred embodiment is quite acceptable for most applications of chemical aid the present invention seeks to provide apparatus for distributing a flowable material and whereby the droplets released to the base surface are of substantially equal size.

According to the present invention apparatus for distributing flowable material over a base surface comprises first, second and third rotary members, means for rotating said rotary members, means for supplying flowable material to said first rotary member and to said second rotary member, mask means arranged to interrupt 40% to 60% of the flowable material centrifuged from said first and second rotary members at locations spaced about the rotational axes of said members, and means for conducting such interrupted flowable material to the third rotary member.

Preferably the rotary members are of substantially equal diameter and said members are mounted for mutual rotation on a common shaft.

Preferably the mask means interrupt the flow of material centrifuged from the first rotary member at two locations and the spaces between said two locations are of different arcuate lengths relative to the rotational axis of said first member. Conveniently the mask means may also interrupt the flow of material centrifuged from the second rotary member at two locations with the spaces between said locations being of different arcuate lengths relative to the rotational axis of said second member.

Preferably the volume of flowable material passing between said locations from the first rotary member is different from the volume of material between said locations from the second rotary member.

In a preferred embodiment in accordance with the invention the apparatus comprises a shaft, first, second and third rotary members secured on said shaft in spaced apart relationship, means for rotating said shaft at constant speed, a mask of annular configuration surrounding said first and second rotary members generally concentric with the axis of said shaft, and means for supplying flowable material to said first and second rotary members, said mask including two circumferentially spaced slots so aligned relative to the first rotary member as to allow flowable material centrifuged from said first rotary member to pass therethrough, two circumferentially spaced slots so aligned relative to the second rotary member as to allow flowable material centrifuged from the second rotary member to pass therethrough, and means for directing flowable material centrifuged from said first and second rotary members and arrested by the mask to said third rotary member.

The mask conveniently includes a cylindrical section with said slots located in said section, and said means for directing flowable material to the third rotary member comprises a frusto-conical mask portion closed at its lower end and having a duct outlet adjacent the said shaft and through which duct flowable material interrupted by the mask flows to the third rotary member. The said means for rotating said rotary member conveniently comprises a motor mounted on the mask.

Preferably the volume of flowable material from the first rotary member interrupted by said mask constitutes between 40% and 60% of the volume of flowable material supplied thereto.

Preferably said means for supplying flowable material comprise a duct individual to said first rotary member and a duct individual to said second rotary member. Said ducts preferably communicate with a common flowable material supply.

Preferably the means for supplying flowable material to said first rotary member and said second rotary member is arranged to supply said material equally to said members.

In a preferred arrangement for supplying flowable material to the first and second rotary members there is provided a common flowable material supply with two branch ducts, one branch duct serving to supply flowable material to said first rotary member and the other branch duct serving to supply flowable material to the second rotary member, each of said first and second branch ducts including an inverted U bend, the highest point of which is higher than the junction of that duct with the common supply and the highest points of the inverted U bends lying in the same horizontal plane when the apparatus is in use.

The invention also envisages a vehicle intended to be traversed over the ground in combination with a plurality of apparatuses for distributing flowable material in accordance with the invention, said apparatuses being mounted on the vehicle in spaced apart relationship relative to the intended direction of travel for the vehicle. Preferably the plurality of apparatuses are supplied with flowable material from a common source.

The invention will now be described further by way of example with reference to the accompanying drawings in which:

FIG. 1 shows a vertical centre-line cross-section through apparatus, for distributing flowable material, in the plane F-W shown in FIG. 2, FIG. 2 shows a cross-section through the apparatus on the line II—II in FIG. 1.

FIG. 3 shows an alternative embodiment of a flowable material supply arrangement for the apparatus shown in FIGS. 1 and 2.

FIG. 4 shows a plan view of the flowable material supply arrangement shown in FIG. 3, FIG. 5 shows a side view of the flowable material supply arrangement shown in FIG. 3, and FIG. 6 shows a plurality of flowable material distribution arrangement mounted on a vehicle.

In the embodiment shown in FIG. 1 a mask, generally identified by numeral 11, presents upper and lower bearings 12 and 13 respectively and the drive shaft 14 of an electric motor 15 mounted on the mask 11 extends downwardly through upper bearing 12 and lower bearing 13 to project from the lower end of the mask 11. The shaft 14 has three rotary members 16, 17 and 18 secured thereon in vertically spaced relationship with the members 16 and 17 located within the upper regions of mask 11 and the member 18 beneath the mask 11.

The mask 11 comprises a cylindrical section 19, closed at its upper end by an annular cover 20 upon which the motor 15 is secured, and an inverted truncated cone section 21 depending from the lower regions of the section 19. The lower end of the section 21 is closed by an end wall 22 parallel to the cover 20 and a cylindrical skirt 23 depends downwardly from section 21 to shield the rotary member 18.

Flowable material is supplied to the apparatus from an external source, generally identified by numeral 24, by a conduit 25, extending from source 24 through the cover 20 to discharge flowable material onto rotary member 16, and a conduit 26 which extends through the cylindrical wall 19 of the cover 20 to discharge flowable material onto rotary member 17. A duct 27, supported by wall 22, allows flowable material in the lower regions of cone section 21 to discharge onto the rotary member 18.

As will be seen from FIG. 1 conduit 25, conduit 26, and duct 27, discharge flowable material close to the rotational axis of their respective rotary members 16, 17 and 18 and, due to the high rotational speed of said members 16, 17 and 18, the flowable material spreads circumferentially so that, at the base of the upstanding peripheral wall **16*a*, 17*a* and 18*a* respectively of the members 16, 17 and 18 the material has substantially uniform depth. Discrepancies in the circumferential distribution of the flowable material are ironed out as the material climbs up the respective upstanding wall 16*a*, 17*a* or 18*a* and centrifugal force acting on the material increases rapidly as the material traverses radially across the upper edge of the respective peripheral wall 16*a*, 17*a* or 18*a*. The rotary members 16, 17 and 18 have, at the upper edge of their respective upstanding peripheral walls 16*a*, 17*a* and 18*a*, outstanding flanges 16*b*, 17*b* and 18*b* respectively which flanges 16*b*, 17*b* and 18*b* are serrated (not shown) in known manner to assist the material flowing over the upper edge of the upstanding peripheral walls 16*a*, 17*a* and 18*a*** to disperse from the periphery of the members as discrete droplets of substantially uniform size.

The supply of flowable material to the rotary member 16 via conduit 25 is substantially equal to the supply of material to the rotary member 17 via conduit 26 and as the rotary members 16 and 17 are of identical configuration and rotate at the same speed the size of the droplets issuing from the periphery of rotary member 16 is the same as for rotary member 17.

The cylindrical section 19 of the mask 11 has two slots 28 and 29 located to allow flowable material distributed from the periphery of rotary member 17 to pass therethrough. The slot 28 has an arcuate length "A" of 100°6', the slot 29 has an arcuate length "B" of 77°2', and the two interrupting sections of the mask 11 between the slots 28 and 29 each have an arcuate length of 91°16'. In like manner the cylindrical section 19 also includes two slots 30 and 31 located to allow flowable material distributed from the periphery of rotary member 16 to pass therethrough. The slot 30 has an arcuate length "C" of 112°54', the slot 31 has an arcuate length "D" of 94°20', and the two interrupting sections between slots 30 and 31 each has an arcuate length of 76°23'.

Thus, when the apparatus is operating and rotary members 16 and 17 are rotating in the direction of the arrow "E" shown in FIG. 2 and with flowable material supplied equally and at constant rate to members 16 and 17, some 49.3% of the material supplied to member 17 is distributed through slots 28 and 29 whilst some 50.7% is interrupted by the sections between slots 28 and 29, and some 57.6% of the flowable material supplied to member 16 is distributed through slots 30 and 31 whilst some 42.4% is arrested by the sections between slots 30 and 31 and the interrupted 50.7% and interrupted 42.4% of flowable material from member 17 and 16 respectively flows down the inside of mask 11 and is released into the member 18. Thus, member 18 receives some 93.1% of the total volume of material supplied to the members 16 or 17.

To assist in a sharp cut-off at the leading edges of slots 28, 29, 30 and 31, and to prevent breakdown of the droplets striking the leading edges of said slots, it has been found advantageous to provide deflector plates **28*a*, 29*a*, 30*a* and 31*a* at the leading edges of slots 28, 29, 30 and 31 respectively. Similar deflector plates (not shown) may be provided at the trailing edges of slots 28, 29, 30 and 31**.

In the second embodiment for a material feed shown in FIGS. 3, 4 and 5 a substantially vertical supply conduit 41 terminates at its lower end in a substantially horizontal T junction, one limb of which forms part of an outlet duct 42 and the other limb forms part of an outlet duct 43. Outlet duct 42 comprises a horizontal section **42*a*, a substantially vertical section 42*b*, an inverted U section 42*c*, a vertically downward section 42*d*, and an inclined section 42*e*. The lower end of inclined section 42*e* terminates in a nozzle 44. In like manner, the outlet duct 43 comprises a horizontal section 43*a*, a substantially vertical section 43*b*, an inverted U section 43*c*, a substantially vertical section 43*d* and an inclined section 43*e*, with a nozzle 45** at the lower end thereof. The two outlet ducts 41 and 42 have identical cross sectional areas at identical sections.

With the above described feed arrangement flowable material from a supply source (not shown) flows down conduit 41 and splits at the T junction to flow through outlet ducts 42 and 43 for release at nozzles 44 and 45.

The horizontal sections 42a and 43a lie in the same horizontal plane at the junctions with conduit 41 and the maximum height to which the inverted U section 42c conducts flowable material above section 42a is identical with that to which inverted U section 43c lifts flowable material above section 43a. The flowable material passing along outlet duct 42 in the vertical section 42b and the rising part of inverted U section 42c exerts a back pressure or resistance to flow exactly equal to the back pressure or resistance to flow in outlet conduit 43. Further, the nozzle 44 lies at a vertical distance below the highest level of inverted U section 42c exactly equal to the vertical distance of nozzle 45 below the highest level of inverted U section 42c and thus, as outlet ducts 42 and 43 are of equal cross sections, generate identical back pressures to the flow of material therethrough and present the same "head" to the material flowing downwardly towards and through nozzles 44 and 45 whereby a substantially equal flow of material through nozzles 44 and 45 is obtained.

FIG. 3 shows how the second embodiment feed arrangement replaces the feed arrangement (conduits 25 and 26) shown in FIGS. 1 and 2 and whereby the inclined sections 42e and 43e and part of the vertical sections 42d and 43d of outlet ducts 42 and 43 extend downwardly through cover 20 so that nozzle 45 of outlet duct 43 directs flowable material onto rotary member 16 and nozzle 44 of outlet duct 42 directs flowable material onto rotary member 17.

In the crop spraying arrangement shown in FIG. 6 a transverse frame 50 mounted on wheels 51 and 52 supports a tool bar 53 parallel to the ground G and parallel to the rotational axis of wheels 51 and 52. The tool bar 53 supports three flowable material distribution arrangements 54, 55 and 56 each identical with the flowable material distribution arrangement shown in FIGS. 1 and 2 (or as shown in FIGS. 1 and 2 and modified to include the feed arrangement shown in FIGS. 3, 4 and 5). The arrangements 54, 55 and 56 each include a mounting plate 57 (see FIG. 1) secured to cover 20 and detachably secured to the tool bar 53 to support each arrangement 54, 55 and 56.

As will be apparent from FIG. 2 the droplets are dispensed tangentially from the peripheries of the rotary members 16, 17 and 18 and therefore to obtain, at ground level, spray patterns distributed equally on both sides of the plane F-W passing through the rotational axis of shaft 14 and in the intended direction of travel, the centre line CL—CL (passing centrally through the slots A, B, C and D and through the rotational axis of shaft 14) must be angularly displaced relative to the plane F-W. Thus, as will be seen in FIG. 2, the centre line CL—CL lies at angle H, equal to 39° 30′, to the plane F-W.

A flowable material supply tank 58 mounted on transverse frame 50 supplies a reservoir 59 via a duct 60 and the supply conduits 25,26 (or 41) are supplied with flowable material from the reservoir 59. The frame 50 also supports batteries 61 for supplying the electrical current for the motors 15 of arrangements 54, 55 and 56.

The frame 50 also includes means (not shown) for displacing the crop spray arrangement over the ground G. In a simple arrangement for limited spraying, the frame 50 may present shafts by which the arrangement may be manually displaced whilst for more extensive spraying the frame 50 may include a draw-bar by which the arrangement may be towed by a tractor.

In the illustrated embodiment the arrangements 54, 55 and 56 are located with their rotary members 18, 15 inches to 20 inches above ground level and are spaced apart transverse of the crop spraying arrangement by an amount equal to the diameter of the spray pattern from each arrangement so that at the ground G the spray patterns of arrangement 54 and 55 touch without overlap and the spray patterns of arrangements 55 and 56 touch without overlap.

In operation, with rotary members 16, 17 and 18 all of 80 mm diameter, the arrangements 54, 55 and 56 are supplied with electrical power from batteries 61 to rotate the rotary members 16, 17 and 18 at 1800 rpm, the conduits 25 and 26 (or outlet ducts 42 and 43) supply flowable material at a rate of 85 m.l. per minute to each rotary member 16 and 17 and the flowable material is distributed in a flow pattern having a maximum diameter of 1 m 25 cm at ground level. With the arrangements 54, 55 and 56 arranged as described above to spray without overlap and the spraying arrangement displaced in the forward direction F-W at a uniform speed of 2½ mph, the spray patterns through the slots A, B, C and D are superimposed on the spray pattern of their respective rotary members 18, a substantially uniform distribution of flowable material transverse to the direction of travel is obtained, and a chemical aid distribution in the region of 20 liter/hectare is obtained.

When the crop spraying apparatus is being used as described above without overlap of the spray patterns of adjacent arrangements 54, 55 and 56 difficulty can be experienced in maintaining a close approach of the spray pattern of the side arrangement 54 or 56 adjacent the last pass with the sprayed ground of the previous pass and, in practise, it is possible to leave strips of unsprayed, or double sprayed, ground at the junction of adjacent passes. To overcome this problem, and to double the speed of the vehicle, the material distribution arrangements 54, 55 and 56 may be arranged apart at spacings equal to only half the spray pattern from each arrangement, that is to say at 62.5 cm apart, whereby the edge of the spray pattern from arrangement 54 just contacts the edge of the spray pattern from arrangement 56 at ground level and the spray pattern from arrangement 55 is superimposed on the inner half regions of the spray patterns from arrangements 54 and 55. By closing the transverse spacings of the arrangements additional material distribution arrangements may be mounted on the tool bar.

By this arrangement the vehicle is transversed on a pass so that the spray pattern traversely outwardly of that material distribution arrangement adjacent the last pass over laps the side edge of the last pass.

It will be appreciated that, with the centre line CL—CL of a material distribution arrangement offset from the intended direction of displacement for the assembly over the base surface, said arrangement traversing over the base surface at uniform speed, flowable material supply to the first and second rotary members from a common source, and said first, second, and third rotary members rotating at a speed to centrifuge flowable material supplied thereto as droplets, the flowable material supplied to the third rotary member is centrifuged therefrom to form, at ground level, an annular spray pattern and the different arcuate spray patterns directed forwardly and rearwardly through the slots in the mask by the first and second rotors are superimposed onto the annular spray pattern. The different circumferential lengths of the slots in the mask defined hereinbefore have been found in practice to establish at the ground level, a substantially uniform distribution of flowable material transverse to the direction of travel within the transverse width of the annular spray pattern.

It will also be appreciated that, as the rate of material supplied to and centrifuged from the three rotary members is substantially the same and the three rotary members are of equal peripheral diameter and are rotated at equal peripheral speed, the droplets issued from all three rotary members will be of equal size.

I claim:

1. Apparatus for distributing flowable material over a base surface comprising a mask, first and second rotary members disposed in said mask, a third rotary member disposed exteriorly of said mask, means for rotating said rotary members, means for supplying flowable material to said first rotary member and to said second rotary member, mask means arranged to interrupt 40% to 60% of the flowable material centrifuged from said first and second rotary members at locations spaced about the rotational axes of said members, and means for conducting such interrupted flowable material to the third rotary member.

2. Apparatus as claimed in claim 1 in which the rotary members are of substantially equal diameter and said members are mounted for mutual rotation on a common shaft.

3. Apparatus as claimed in claim 1 in which the mask means interrupt the flow of material centrifuged from the first rotary member at two locations and the spaces between said two locations are of different arcuate lengths relative to the rotational axis of said first member.

4. Apparatus as claimed in claim 1 in which the mask means interrupt the flow of material centrifuged from the second rotary member at two locations and the spaces between said locations are of different arcuate lengths relative to the rotational axis of said second member.

5. Apparatus as claimed in claim 1 in which the volume of flowable material passing between said locations from the first rotary member is different from the volume of material between said locations from the second rotary member.

6. Apparatus comprising a shaft, first, second and third rotary members secured on said shaft in spaced apart relationship, means for rotating said shaft at constant speed, a mask of annular configuration surrounding said first and second rotary members generally concentric with the axis of said shaft, and means for supplying flowable material to said first and second rotary members, said mask including two circumferentially spaced slots so aligned relative to the first rotary member as to allow flowable material centrifuged from said first rotary member to pass therethrough, two circumferentially spaced slots so aligned relative to the second rotary member as to allow flowable material centrifuged from the second rotary member to pass therethrough, and means for directing flowable material centrifuged from said first and second rotary members and arrested by the mask to said third rotary member.

7. Apparatus as claimed in claim 6 in which said mask includes a cylindrical section and said slots are located in said section.

8. Apparatus as claimed in claim 6 in which said means for directing flowable material to the third rotary member comprises a frusto-conical mask portion closed at its lower end and having a duct outlet adjacent the said shaft.

9. Apparatus as claimed in claim 6 in which said means for rotating said rotary member comprises a motor mounted on the mask.

10. Apparatus as claimed in claim 6 in which the volume of flowable material from the first rotary member interrupted by said mask constitutes between 40% and 60% of the volume of flowable material supplied thereto.

11. Apparatus as claimed in claim 6 in which said means for supplying flowable material comprise a duct individual to said first rotary member and a duct individual to said second rotary member.

12. Apparatus as claimed in claim 11 in which said ducts communicate with a common flowable material supply.

13. Apparatus as claimed in claim 1 or 6 in which the means for supplying flowable material to said first rotary member and said second rotary member is arranged to supply said material equally to said members.

14. Apparatus as claimed in claim 6 in which said means for supplying flowable material comprises a common flowable material supply with two branch ducts, one branch duct serving to supply flowable material to said first rotary member and the other branch duct serving to supply flowable material to the second rotary member, each of said first and second branch ducts including an inverted U bend, the highest point of which is higher than the junction of that duct with the common supply and the highest points of the inverted U bends lying in the same horizontal plane when the apparatus is in use.

15. In combination, a vehicle intended to be traversed over the ground and a plurality of apparatus assemblies as claimed in claim 6 mounted on the vehicle in spaced apart relationship relative to the intended direction of travel for the vehicle.

16. The combination set forth in claim 15 and wherein the plurality of apparatus assemblies are supplied with flowable material from a common source.

* * * * *